United States Patent
Park et al.

(10) Patent No.: US 11,147,063 B2
(45) Date of Patent: Oct. 12, 2021

(54) METHOD AND APPARATUS FOR INITIAL ACCESS OF TERMINAL IN WIRELESS COMMUNICATION SYSTEM

(71) Applicant: Samsung Electronics Co., Ltd, Suwon-si (KR)

(72) Inventors: Suyoung Park, Uiwang-si (KR); Suha Yoon, Yongin-si (KR); Euichang Jung, Seoul (KR); Sunghyuk Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 15/984,199

(22) Filed: May 18, 2018

(65) Prior Publication Data
US 2018/0338308 A1 Nov. 22, 2018

(30) Foreign Application Priority Data
May 18, 2017 (KR) .................. 10-2017-0061836

(51) Int. Cl.
*H04W 72/04* (2009.01)
*H04L 5/00* (2006.01)
(Continued)

(52) U.S. Cl.
CPC ......... *H04W 72/0446* (2013.01); *H04L 5/003* (2013.01); *H04W 74/0833* (2013.01);
(Continued)

(58) Field of Classification Search
CPC ..... H04L 5/0053; H04L 5/003; H04L 5/0094; H04W 74/0833; H04W 72/0446; H04W 72/04
See application file for complete search history.

(56) References Cited

U.S. PATENT DOCUMENTS

2009/0175161 A1  7/2009 Yi et al.
2014/0126460 A1* 5/2014 Bienas ............... H04W 74/002
370/315
(Continued)

FOREIGN PATENT DOCUMENTS

WO  2016208897 A1  12/2016

OTHER PUBLICATIONS

ISA/KR, International Search Report for International Application No. PCT/KR2018/005707, dated Aug. 27, 2018, 3 pages.
(Continued)

*Primary Examiner* — Anez C Ebrahim

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method for a terminal may include: identifying a reference subcarrier spacing value; receiving random access channel (RACH) configuration information; determining a resource to be used for transmitting a random access preamble based on the RACH configuration information and the reference subcarrier spacing value; and transmitting the random access preamble using the determined resource.

18 Claims, 16 Drawing Sheets

(51) Int. Cl.
*H04W 74/08* (2009.01)
*H04W 74/00* (2009.01)

(52) U.S. Cl.
CPC ........ *H04W 72/042* (2013.01); *H04W 74/006* (2013.01); *H04W 74/08* (2013.01)

(56) References Cited

U.S. PATENT DOCUMENTS

| | | | |
|---|---|---|---|
| 2018/0145802 A1 | 5/2018 | Hwang et al. | |
| 2018/0220466 A1* | 8/2018 | Park | H04W 72/0446 |
| 2018/0242275 A1* | 8/2018 | Militano | H04W 64/003 |
| 2018/0375698 A1* | 12/2018 | Zhang | H04W 74/006 |

OTHER PUBLICATIONS

Intel Corporation, "PRACH Preamble and Resource Allocation," R1-1702184, 3GPP TSG RAN WG1 Meeting RAN1 #88, Athens, Greece, Feb. 13-17, 2017, 6 pages.
LG Electronics, "Discussion on NR PRACH Preamble," R1-1704868, 3GPP TSG RAN WG1 Meeting #88bis, Spokane, USA, Apr. 3-7, 2017, 14 pages.
LG Electronics, "Discussion on NR PRACH Preamble," R1-1707593, 3GPP TSG RAN WG1 Meeting #89, Hangzhou, China, May 15-19, 2017, 11 pages.
Samsung, "RACH preamble design," R1-1702908, 3GPP TSG RAN WG1 Meeting #88, Athens, Greece, Feb. 13-17, 2017, 11 pages.
Supplementary European Search Report in connection with European Application No. 18802918.5 dated Dec. 16, 2019, 8 pages.
CMCC, "Discussion on RACH configuration," R1-1708389, 3GPP TSG RAN WG1 Meeting #89, Hangzhou, China, May 15-19, 2017, 4 pages.
Nokia, et al., "NR 4-step RACH procedure," R1-1708244, 3GPP TSG-RAN WG1#89, Hangzhou, China, May 15-19, 2017, 12 pages.
ZTE et al., "PRACH Resource Configuration", 3GPP TSG RAN WG1 Meeting #91, Nov. 27-Dec. 1, 2017, R1-1719345, 22 pages.
Communication pursuant to Article 94(3) EPC dated Nov. 12, 2020 in connection with European Patent Application No. 18 802 918.5, 7 pages.
Catt, "Further details on NR 4-step RA Procedure", 3GPP TSG RAN WG1 Meeting #88, Feb. 13-17, 2017, R1-1702066, 6 pages.
Office Action dated Feb. 23, 2021 in connection with Korean Patent Application No. 10-2017-0061836, 10 pages.

* cited by examiner

METHOD AND APPARATUS FOR INITIAL ACCESS OF TERMINAL IN WIRELESS COMMUNICATION SYSTEM

CROSS-REFERENCE TO RELATED APPLICATION AND CLAIM OF PRIORITY

This application is based on and claims priority under 35 U.S.C. § 119(a) to Korean Patent Application No. 10-2017-0061836 filed on May 18, 2017 in the Korean Intellectual Property Office, the disclosure of which is incorporated herein by reference in its entirety.

BACKGROUND

1. Field

The present disclosure relates to a wireless communication system. More particularly, the present invention relates to a method and apparatus for initial access of a terminal.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, both the LTE system and the 5G system are based on orthogonal frequency division multiplexing (OFDM). While the LTE system has a subcarrier spacing (SCS) fixed at 15 kHz, the 5G system is expected to support multiple SCSs (e.g., 7.5 kHz, 15 kHz, 30 kHz, 60 kHz and 120 kHz) to provide various wireless communication services (e.g., eMBB, URLLC and mMTC) in various frequency ranges (e.g., sub-6 GHz and above-6 GHz). Further, in the 5G system, it has been decided to allow time division multiplexing (TDM) or frequency division multiplexing (FDM) of multiple SCSs in one carrier. In addition, while the maximum bandwidth of one component carrier (CC) is assumed to be 20 MHz in LTE, the maximum bandwidth thereof is considered to be up to 1 GHz in the 5G system.

Hence, in the case of the 5G system, the radio resources having different SCSs can be FDMed or TDMed. A subframe is assumed as a basic unit for scheduling in the LTE system, but the 5G system assumes a slot having 7 or 14 symbols as a basic unit for scheduling. In other words, the duration of the subframe is always set to 1 ms in the LTE system, but the slot length can be changed according to the SCS in the 5G system. According to this change, in the 5G system, the transmission scheme of the random access preamble is specified differently in the physical random access channel (PRACH).

SUMMARY

The present disclosure has been made in view of the above problems. Accordingly, an aspect of the present disclosure is to provide a method and apparatus for transmitting a random access preamble through the PRACH in a 5G communication system.

In accordance with an aspect of the present disclosure, there is provided a method for a terminal. The method may include: identifying a reference subcarrier spacing value; receiving random access channel (RACH) configuration information; determining a resource to be used for transmitting a random access preamble based on the RACH configuration information and the reference subcarrier spacing value; and transmitting the random access preamble using the determined resource.

In accordance with another aspect of the present disclosure, there is provided a method for a base station. The method may include: transmitting random access channel (RACH) configuration information; and receiving a random access preamble through a resource determined based on the RACH configuration information and a reference subcarrier spacing value.

In accordance with another aspect of the present disclosure, a terminal is provided. The terminal may include: a transceiver; and a controller configured to identify a reference subcarrier spacing value, receive random access channel (RACH) configuration information, determine a resource to be used for transmitting a random access preamble based on the RACH configuration information and the reference subcarrier spacing value, and transmit the random access preamble using the determined resource.

In accordance with another aspect of the present disclosure, a base station is provided. The base station may include: a transceiver; and a controller configured to transmit random access channel (RACH) configuration information, and receive a random access preamble through a resource determined based on the RACH configuration information and a reference subcarrier spacing value.

In a feature of the present disclosure, there is provided a method for transmitting a random access preamble in a communication system in which the slot length is changed according to the SCS. Hence, it is possible to provide communication services through multiple SCSs in one carrier.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
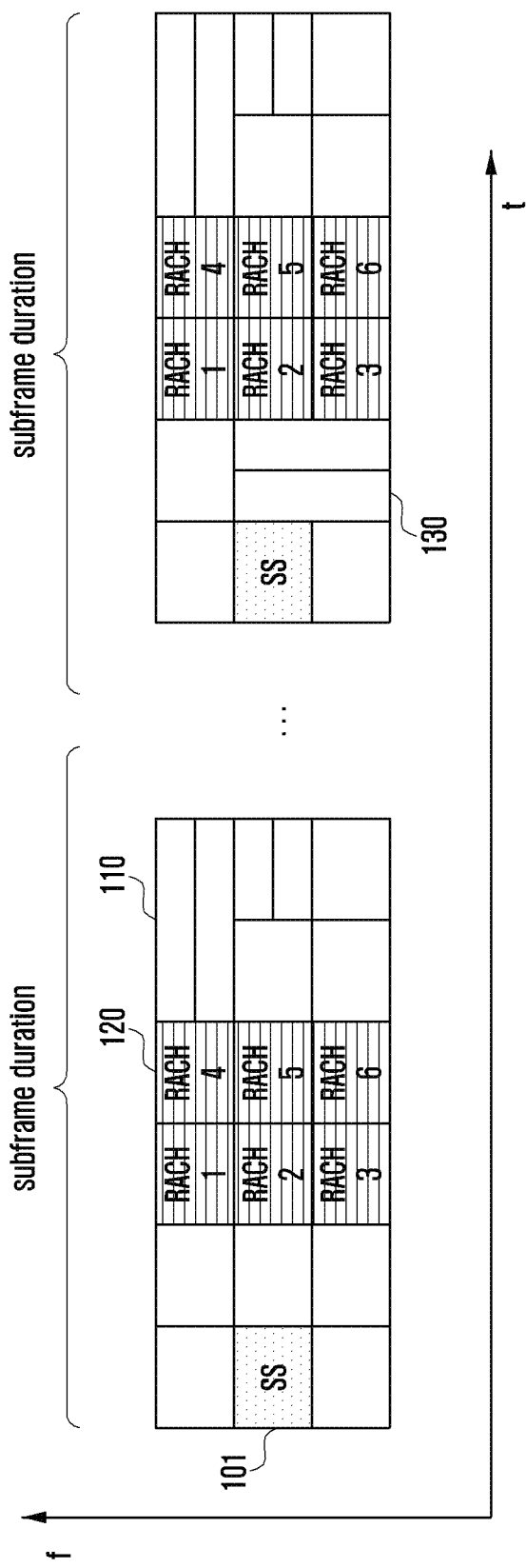
FIG. 1 illustrates a frame structure that may appear in a 5G system according to an embodiment of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure are described in detail with reference to the accompanying drawings.

Descriptions of functions and structures well known in the art and not directly related to the present disclosure may be omitted for clarity and conciseness without obscuring the subject matter of the present disclosure.

In the drawings, some elements are exaggerated, omitted, or only outlined in brief, and thus may be not drawn to scale. The same or similar reference symbols are used throughout the drawings to refer to the same or like parts.

The aspects, features and advantages of certain embodiments of the present disclosure will be more apparent from the following detailed description taken in conjunction with the accompanying drawings. The description of the various embodiments is to be construed as examples only and does not describe every possible instance of the present disclosure. It should be apparent to those skilled in the art that the following description of various embodiments of the present disclosure is provided for illustration purpose only and not for the purpose of limiting the present disclosure as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

Steps or operations of a method described in a diagram may be executed in an order different from the listed order. For example, two steps listed in sequence may be executed at the same time or executed in reverse order.

The following description of the present disclosure is focused on wireless communication systems for ease of description. However, the subject matter of the present disclosure can also be applied to wired communication systems.

LTE uses a subcarrier spacing (SCS) of 15 kHz. One radio frame is composed of 10 subframes; one subframe is composed of two slots; and one slot is composed of 14 symbols.

In the frequency domain, fourteen 15 kHz subcarriers constitute one resource block (RB). LTE can provide various bandwidths by adjusting the number of RBs included in the carrier according to the bandwidth demand. For example, a 20 MHz LTE carrier includes 100 RBs, and a 10 MHz LTE carrier includes 50 RBs.

In LTE, a random access channel (RACH) procedure may be performed for the initial access. The RACH procedure may include a procedure in which the terminal transmits a random access preamble via a random access channel for initial access. In the description, the process of transmitting a random access preamble through the RACH may be referred to as RACH transmission. The RACH procedure may be a contention based process or a non-contention based process and can be performed differently in accordance with the state and usage of the terminal. In LTE, the random access preamble is transmitted at a 1.25 kHz SCS.

The RACH transmitted at the physical (PHY) layer may be referred to as PRACH. In the description, the terms "RACH" and "PRACH" may be used interchangeably.

In addition, the PRACH transmission scheme may be different for each cell (cell-specific), and related information can be broadcast by the base station.

In the LTE system, PRACH transmission is based on a subframe, and this information can be transmitted by the base station to the terminal as shown in Table 1 below.

TABLE 1

| PRACH Configuration Index | Preamble Format | System frame number | Subframe number | PRACH Configuration Index | Preamble Format | System frame number | Subframe number |
|---|---|---|---|---|---|---|---|
| 0 | 0 | Even | 1 | 32 | 2 | Even | 1 |
| 1 | 0 | Even | 4 | 33 | 2 | Even | 4 |
| 2 | 0 | Even | 7 | 34 | 2 | Even | 7 |
| 3 | 0 | Any | 1 | 35 | 2 | Any | 1 |
| 4 | 0 | Any | 4 | 36 | 2 | Any | 4 |

In this case, if the base station transmits only the PRACH configuration index to the terminal, the terminal may perform PRACH transmission using the preamble format, system frame number, and subframe number associated with the PRACH configuration index. The preamble format is determined by the coverage of the cell. In LTE, five preamble formats are defined. Basically, the PRACH can be transmitted at all system frame numbers. In the case of a connected terminal, the PRACH can be transmitted at even system frame numbers with PRACH configuration indexes 0, 1, 2, 32, 33, 34. Multiple subframe numbers may be associated with the same PRACH configuration index in the table.

In the case of 5G communication, as described above, radio resources having different SCSs may be FDMed or TDMed. A subframe is assumed as a basic unit for scheduling in LTE, but the 5G system assumes a slot having 7 or 14 symbols as a basic unit for scheduling. In other words, the duration of the subframe is always set to 1 ms in the LTE system, but the slot length can be changed according to the SCS in the 5G system. According to this change, in the 5G system, the transmission scheme of the random access preamble is defined differently in the physical random access channel (PRACH). It is also possible to use two or more different SCSs for transmitting the random access preamble in the 5G system. For example, when the length of the random access preamble sequence is 839, the SCS of the random access preamble may be at least one of 1.25, 2.5, and 5 kHz. When the length of the random access preamble sequence is 63 or 71, the SCS of the random access preamble may be at least one of 15, 30, 60, 120, and 240 kHz. When the length of the random access preamble sequence is 127 or 139, the SCS of the random access preamble may be at least one of 7.5, 15, 30, 60, and 120 kHz.

The random access preamble sequence uses the Zadoff-Chu sequence given by the following equation, where u denotes the root index of the ZC sequence, and $N_{zc}$ denotes the length of the random access preamble sequence.

$$x_u(n) = e^{-j\frac{\pi u n(n+1)}{N_{ZC}}}, 0 \le n \le N_{ZC} - 1$$

Here, $N_{ZC}$ can be determined to be 839, 63, 71, 127, or 139.

The 5G system aims to provide various types of services. For this purpose, the 5G system is designed to broadcast information on the services that can be supported by the base station.

The relationship between the information on the supported services and the resource for RACH transmission (RACH resource) may be notified by the base station, or may be specified in advance. The relationship between the services supported by the base station and the RACH resources can be used by the terminal to determine the RACH resource corresponding to the service to be received by the terminal. Next, a description is given of a scheme for determining the RACH resource.

FIG. 1 illustrates a frame structure that may appear in the 5G system according to an embodiment of the present disclosure.

In FIG. 1, each block represents a slot. The slot may be configured in various ways depending on the SCS between the subcarriers constituting the slot. Specifically, as illustrated by the slots 110, 120 and 130, the slot length may vary according to the SCS, and the number of slots included within 1 ms may also vary.

Meanwhile, to increase the degree of freedom in resource allocation of the base station, it is possible to consider transmitting the PRACH at a slot not positioned at the beginning of the subframe. In this case, since the terminal cannot know how many slots are included in one subframe before receiving information on the SCS, it cannot know the position of the slot at which the PRACH can be transmitted. Hence, it is necessary to define a scheme for specifying the position of the slot at which the terminal transmits the PRACH.

In FIG. 1, the block 101 labeled "SS" is an SS block (synchronization block), which may include PSS, SSS, PBCH, and the like. The SCS of the SS block can be preset for its operating frequency. For example, the SCS of the SS block can be set to 15 kHz or 30 kHz for frequencies below 3 GHz. As another example, for frequencies between 3 GHz and 6 GHz, the SCS of the SS block can be set to 15 kHz, 30 kHz, or 60 kHz. As another example, for frequencies between 6 GHz and 40 GHz, the SCS of the SS block can be set to 120 kHz or 240 kHz. The PSS, SSS, and PBCH are all transmitted using the same SCS.

The PBCH may carry at least a portion of information for performing initial access. The PBCH may also carry resource information including another portion of the information for performing initial access. Here, the SCS information of the resource may be included in the PBCH.

The SCS information can be transmitted to the terminal by use of radio resource control (RRC) information or system information. Specifically, when the terminal transmits the RACH in the connected state, it may receive information on the SCS through RRC signaling or system information.

As a first option for specifying the slot position, the terminal may transmit the PRACH at the first slot of a subframe. In this case, the base station may notify the terminal of the subframe number at which the terminal can transmit the PRACH. For example, the base station may transmit a PRACH configuration index to the terminal to notify the subframe at which the terminal can transmit the PRACH. Then, the terminal can transmit the PRACH at the first slot of the subframe indicated by the PRACH configuration index.

As a second option for specifying the slot position, the terminal may transmit the PRACH at a slot other than the first slot of a subframe. In this case, the terminal and the base station should calculate the timing information or the position information of the slot for PRACH transmission in the same manner. In the description, the timing information or the position information of the slot for PRACH transmission is referred to as slot information.

Here, the slot information in a subframe may be computed using the reference SCS.

Specifically, the reference SCS can be determined based on the SCS (SS SCS) of the block in which the synchronization signal is received (synchronization block). In a specific frequency range, one subcarrier spacing may be used for synchronization. The synchronization block may have a fixed subcarrier spacing according to the frequency range. Hence, the terminal and the base station can calculate the slot information based on the subcarrier spacing of the block in which the synchronization signal is received.

The SCS of the SS block may be preset for its operating frequency. For example, in a frequency band below 3 GHz, the SCS of the SS block can be set to 15 kHz or 30 kHz. As another example, for frequencies between 3 GHz and 6 GHz, the SCS of the SS block can be set to 15 kHz, 30 kHz, or 60 kHz. As another example, for frequencies between 6 GHz and 40 GHz, the SCS of the SS block can be set to 120 kHz or 240 kHz. The PSS, SSS, and PBCH are all transmitted using the same SCS. As another embodiment, when determining the reference SCS based on the SCS of the subcarrier of the PRACH preamble, it is possible to calculate the slot information in a subframe using the reference SCS. The PBCH may carry at least a portion of information for performing initial access. The PBCH may also carry resource information including another portion of the information for performing initial access. Here, the information for performing initial access transmitted via the PBCH or the resource indicated by the PBCH may include the SCS information of the random access preamble. Hence, it is possible to determine the reference SCS based on the SCS information of the random access preamble, and determine the slot information using the reference SCS.

When the reference SCS is determined as described above, the slot information can be calculated using the reference SCS. As an example of this, if the reference SCS is based on the SS SCS, the following equation may be utilized.

$$\text{SLOT}_{PRACH} \text{ in System Frame} = \text{Subframe}_{RACH} * \left(2 * \frac{SCS_{SS}}{15 \text{ kHz}}\right) * \text{SLOT}_{Offset} \quad \text{[Equation 1]}$$

Here, the subframe information for transmitting the RACH can be indicated through the RACH configuration index as described before. The slot offset value (or $\text{SLOT}_{offset}$) can also be indicated through the RACH configuration index. Since the RACH configuration index does not indicate $\text{SLOT}_{offset}$ in the related art, a table as shown in Table 2 below can be used to indicate the RACH configuration $\text{SLOT}_{offset}$.

which the PRACH can be transmitted. That is, as described above, it is possible to specify a table indicating the relationship between the RACH configuration index, and the subframe information and the $\text{SLOT}_{offset}$ information. Hence, the base station can indicate the subframe number and the slot offset number by using the RACH configuration index. Here, in the embodiment using the SCS of the SS block, the range of the $\text{SLOT}_{offset}$ (n in Table 2) transmitted by the base station may be given as follows.

$$0 \sim \left(\left(2 * \frac{SCS_{SS}}{15 \text{ kHz}}\right) - 1\right)$$

In another embodiment, the base station can transmit the terminal only information on the subframe in which the PRACH can be transmitted, and information on the $\text{SLOT}_{offset}$ can be separately transmitted to the terminal. That is, as described above, the base station can transmit information on the $\text{SLOT}_{offset}$ to the terminal by using the synchronization signal, system information, or the like. Hence, the terminal can determine the slot in the corresponding subframe by checking the $\text{SLOT}_{offset}$ value obtained through the PSS, SSS or PBCH of the SS block or other signaling information.

In another embodiment, the terminal may arbitrarily determine a slot. That is, the terminal can transmit the PRACH at any slot of the corresponding subframe.

TABLE 2

| PRACH Configuration Index | PRACH format (# of Repetition) | Symbol Offset Enable | System frame number | Subframe number | Length of PRACH | Slot number (time offset) | PRACH subset (Freq. Offset) |
|---|---|---|---|---|---|---|---|
| 0~M | 0~N_1 (symbol) 0~N_2 (Slot) | O/X | Even/Odd | 1 | 0~1 0 = 839, 1 = (63/71/127/139) | Even/Odd (or mod n) | 1~P |

Alternatively, the RACH configuration index may be utilized in the same manner as usual, and $\text{SLOT}_{offset}$ may be separately transmitted through the SIB or the like.

However, the present disclosure is not limited to the above embodiment, and the details will be described later.

Figure 2:
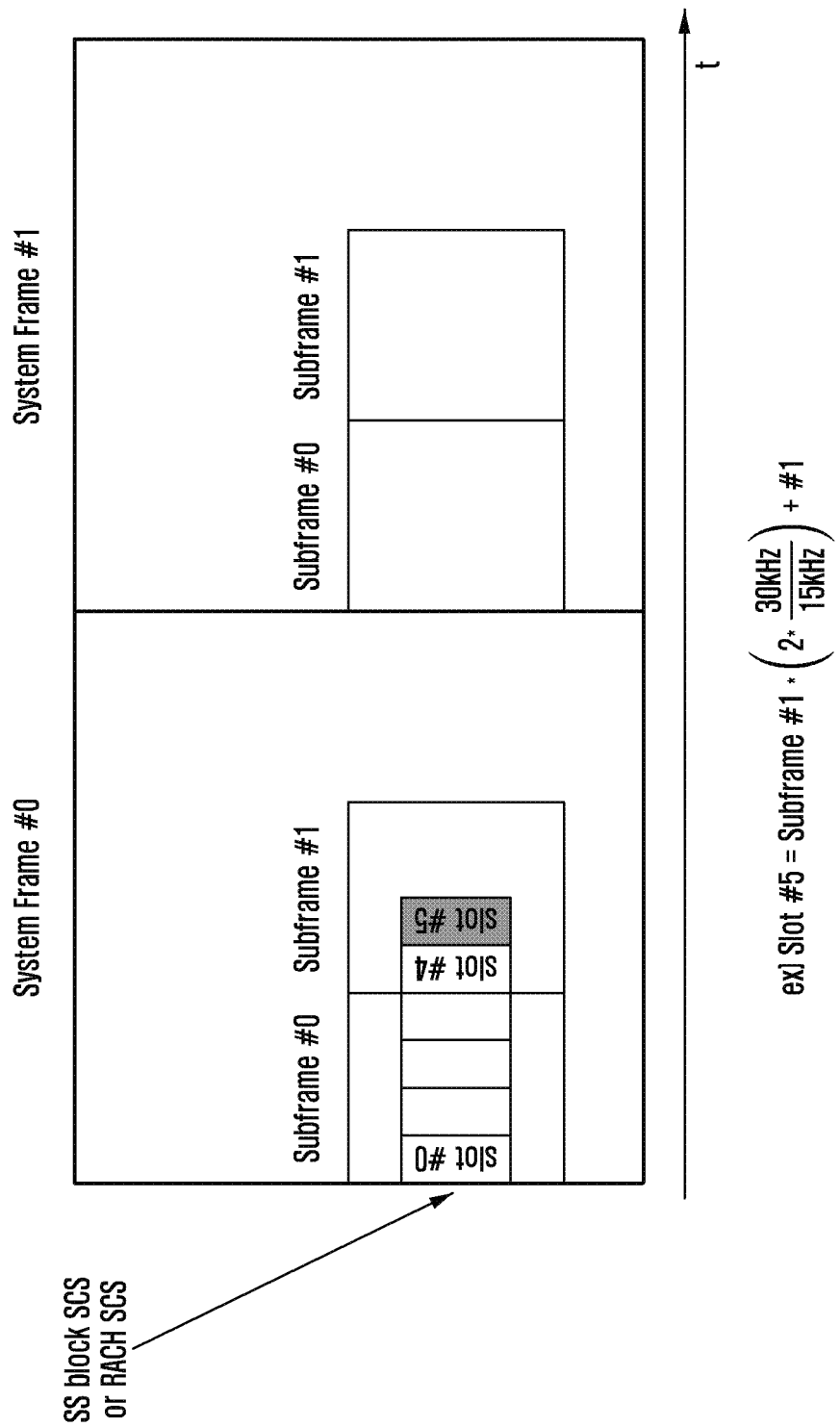
FIG. 2 illustrates a scheme for determining slot information according to an embodiment of the present disclosure.

FIG. 2 illustrates a scheme for determining slot information according to an embodiment of the present disclosure.

In FIG. 2, the SCS of the SS block is 30 kHz, and four slots are included in one subframe. It is assumed that a RACH configuration including subframe number 1 and $\text{SLOT}_{offset}$ 1 is received and the PRACH is transmitted at slot #5 included in subframe #1. In the description, the "subframe" may refer to a time resource corresponding to 1 ms, and the "subframe index" may refer to an index determined by dividing the time resources in units of 1 ms.

Hence, the slot information can be calculated as follows using Equation 1 based on the received information.

$$\text{ex) Slot \#5} = \text{Subframe \#1} * \left(2 * \frac{30 \text{ kHz}}{15 \text{ kHz}}\right) + \#1$$

As described above, to confirm that the terminal transmits the PRACH at slot #5, information on the subframe number and $\text{SLOT}_{offset}$ is used.

To the end, as an embodiment, the base station can transmit information on both the subframe and the slot in In another embodiment, to permit the terminal to determine the slot, the base station may specify in advance the relationship between the supported services and the RACH resources and notify the terminal of the relationship. That is, the base station can determine the RACH resource based on the service to be received by the terminal according to the relationship between the services that can be supported and the RACH resources.

In this embodiment, the terminal can utilize the corresponding slot information (slot timing information) for the 5G RA-RNTI. In other words, the base station may identify the PRACH preamble by combining at least one of the preamble ID, frequency resource information, subframe information among the time resource information, and slot information among the time resource information. That is, the RA-RNTI may be generated by combining at least one of the preamble ID, frequency resource information, subframe information among the time resource information, and slot information among the time resource information.

In LTE, the terminal selects one of the 64 RACH preamble IDs based on the information received from the base station, and transmits the selected one using a specific frequency resource and time resource. The base station checks the received RACH preamble ID to generate random access response (RAR) data, generates an RA-RNTI using the corresponding frequency resource and time resource, and applies the RA-RNTI to the RAR data as a CRC value.

In the present disclosure, the RA-RNTI can be generated by combining at least one of the preamble ID, frequency resource information, subframe information among the time resource information, and slot information among the time resource information as well as the frequency resource and time information used to transmit the preamble. The base station can identify the PRACH preamble using the above information at the resource where the preamble is received.

Specifically, the RA-RNTI can be calculated using Equation 2 shown below. Here, the values of a, b, and c may vary.

$$RA\text{-}RNTI = 1 + a^* t\_id\_\text{subframe} + b^* t\_id\_\text{slot} + c^* f\_id \quad \text{[Equation 2]}$$

That is, the RA-RNTI may be determined based on not only the frequency ID but also the time ID of the slot and the time ID of the subframe.

Figure 3:
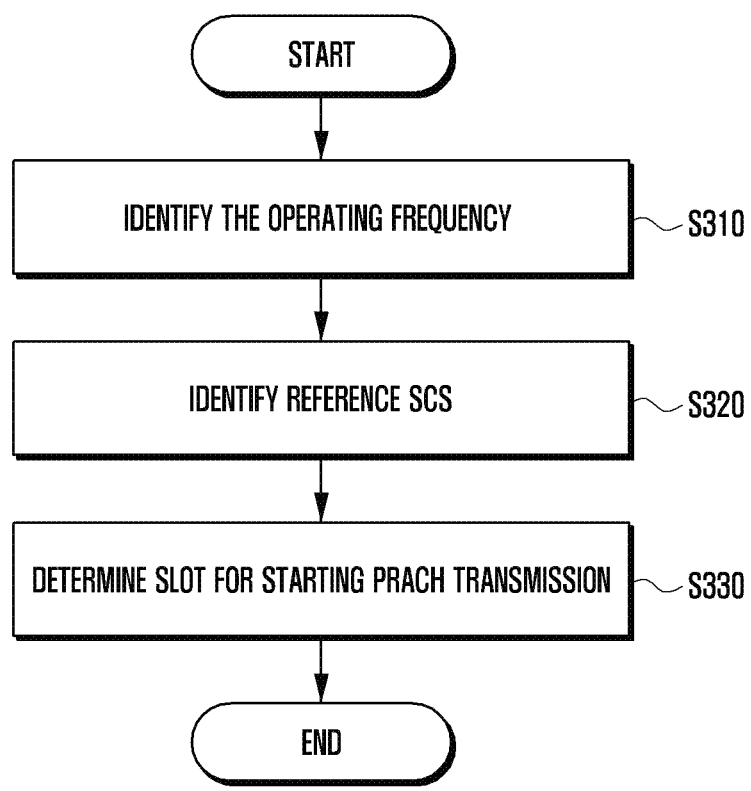
FIG. 3 illustrates a flowchart of a scheme for determining slot information to transmit the PRACH according to an embodiment of the present disclosure.

FIG. 3 illustrates a flowchart of a scheme for determining slot information to transmit the PRACH according to an embodiment of the present disclosure. With reference to FIG. 3, at step S310, the terminal may identify the operating frequency. To identify the operating frequency, the terminal can measure the signal strength by sampling the configured frequency band at a specific frequency interval. If a signal with a preset strength or more is detected in a specific frequency band, the terminal can identify the frequency band as the operating frequency. To identify the operating frequency, it is also possible to check whether PSS/SSS decoding is successful.

At step S320, the terminal can identify the reference subcarrier spacing. The reference subcarrier spacing may mean a value used by the terminal to determine the resource (or, slot information) for transmitting the RACH.

As described above, the terminal can identify the reference subcarrier spacing based on the subcarrier spacing of the synchronization block. The terminal can identify the subcarrier spacing of the synchronization block determined according to the operating frequency identified at S310.

As described before, the subcarrier spacing of the synchronization block may be determined in advance according to the bandwidth of the operating frequency, and the terminal can identify the subcarrier spacing of the synchronization block according to the operating frequency.

The SCS of the SS block may be preset for its operating frequency. For example, in a frequency band below 3 GHz, the SCS of the SS block can be set to 15 kHz or 30 kHz. As another example, for frequencies between 3 GHz and 6 GHz, the SCS of the SS block can be set to 15 kHz, 30 kHz, or 60 kHz. As another example, for frequencies between 6 GHz and 40 GHz, the SCS of the SS block can be set to 120 kHz or 240 kHz. The PSS, SSS, and PBCH are all transmitted using the same SCS.

In the description, the subcarrier spacing of the synchronization block is used as the reference subcarrier spacing. However, the present disclosure is not limited thereto. For example, the reference subcarrier spacing may be determined to be a different value based on the subcarrier spacing of the synchronization block.

Alternatively, as described before, the terminal may determine the reference SCS based on the SCS of the subcarrier of the PRACH preamble. The details are the same as those described above and will not be described further.

Thereafter, at step S330, the terminal may determine the slot information to be used for transmitting the PRACH. The terminal may determine the slot information based on the reference subcarrier spacing.

Specifically, the terminal may calculate the slot information by using the reference subcarrier spacing, subframe index information, and slot offset information. The details of determining the slot information are the same as those described before and will not be described further.

Figure 4:
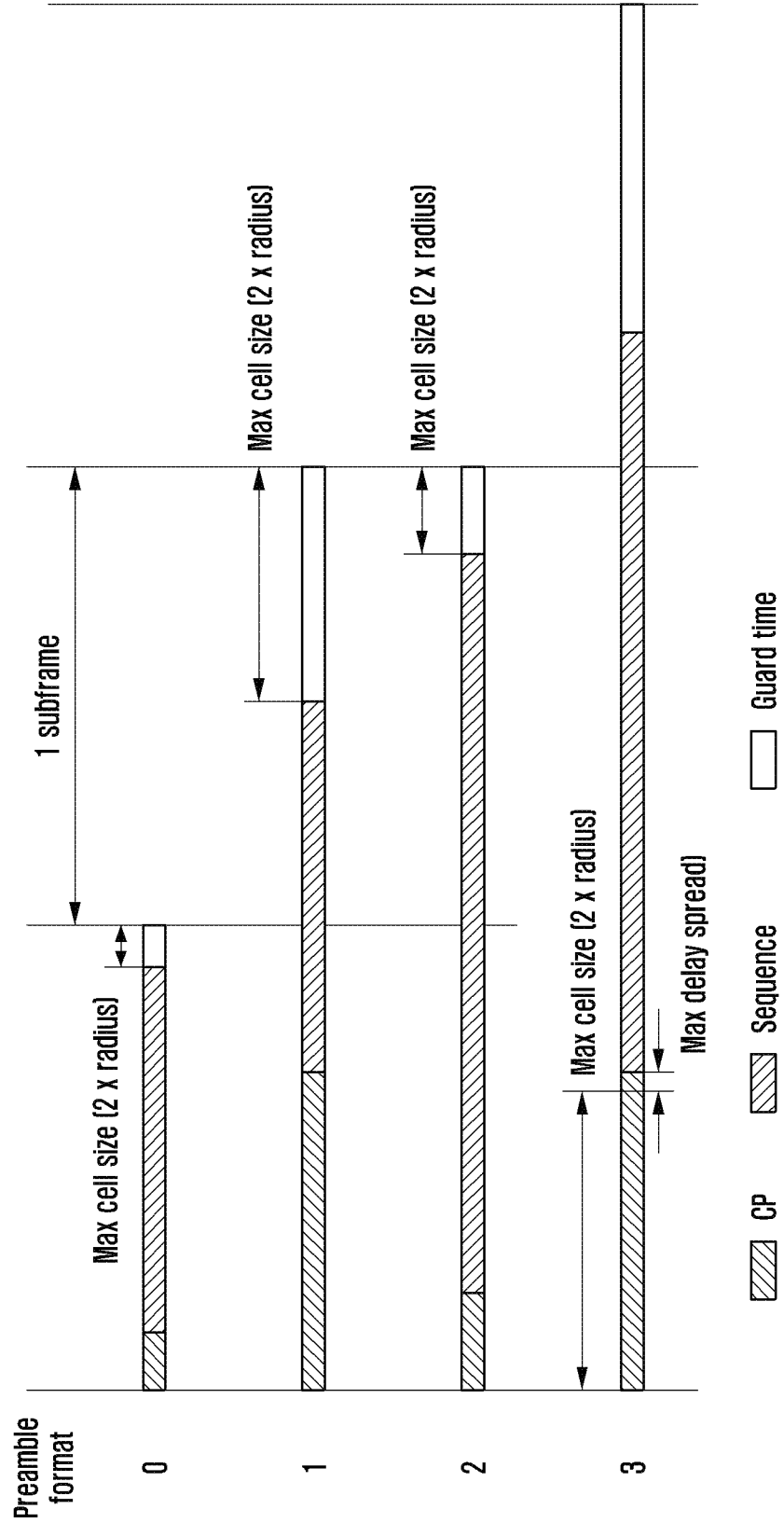
FIG. 4 illustrates the RACH format.

FIG. 4 illustrates the RACH format.

In the LTE system, the PRACH format is defined as shown in Table 3 below. The base station uses the PRACH configuration index to broadcast the PRACH format corresponding to the cell radius.

TABLE 3

| preamble format | Tcp | TSEQ |
| --- | --- | --- |
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 (see Note) | $448 \cdot T_s$ | $4096 \cdot T_s$ |

NOTE:
Frame structure type 2 and special subframe configurations with UpPTS lengths $4384 \cdot T_s$ and $5120 \cdot T_s$ only.

With reference to FIG. 4, in the case of preamble format 0, the random access preamble can be formed by combining one CP, one sequence, and one guard time (or, guard period), and may be transmitted in one subframe.

In the case of preamble format 1, the random access preamble may be formed by combining a CP having a length longer than that for preamble format 0, one sequence, and one guard time, and may be transmitted over two subframes.

In the case of preamble format 3, the random access preamble may be formed by combining a CP having a length identical to that for preamble format 1, two repeated sequences, and one guard time, and may be transmitted over three subframes.

On the other hand, in 5G communication, the number of repetitions of the RACH preamble sequence, the length of the CP/GT (guard time), and the number of RACH symbol transmissions can be flexibly controlled. Hence, it is necessary to provide a scheme for notifying the terminal of the number of repetitions of the RACH preamble sequence, the length of the CP/GT, and the number of RACH symbol transmissions.

To this end, the base station can transmit available RACH preamble format information to the terminal. The base station may use various schemes to indicate the RACH preamble format.

Figure 5:
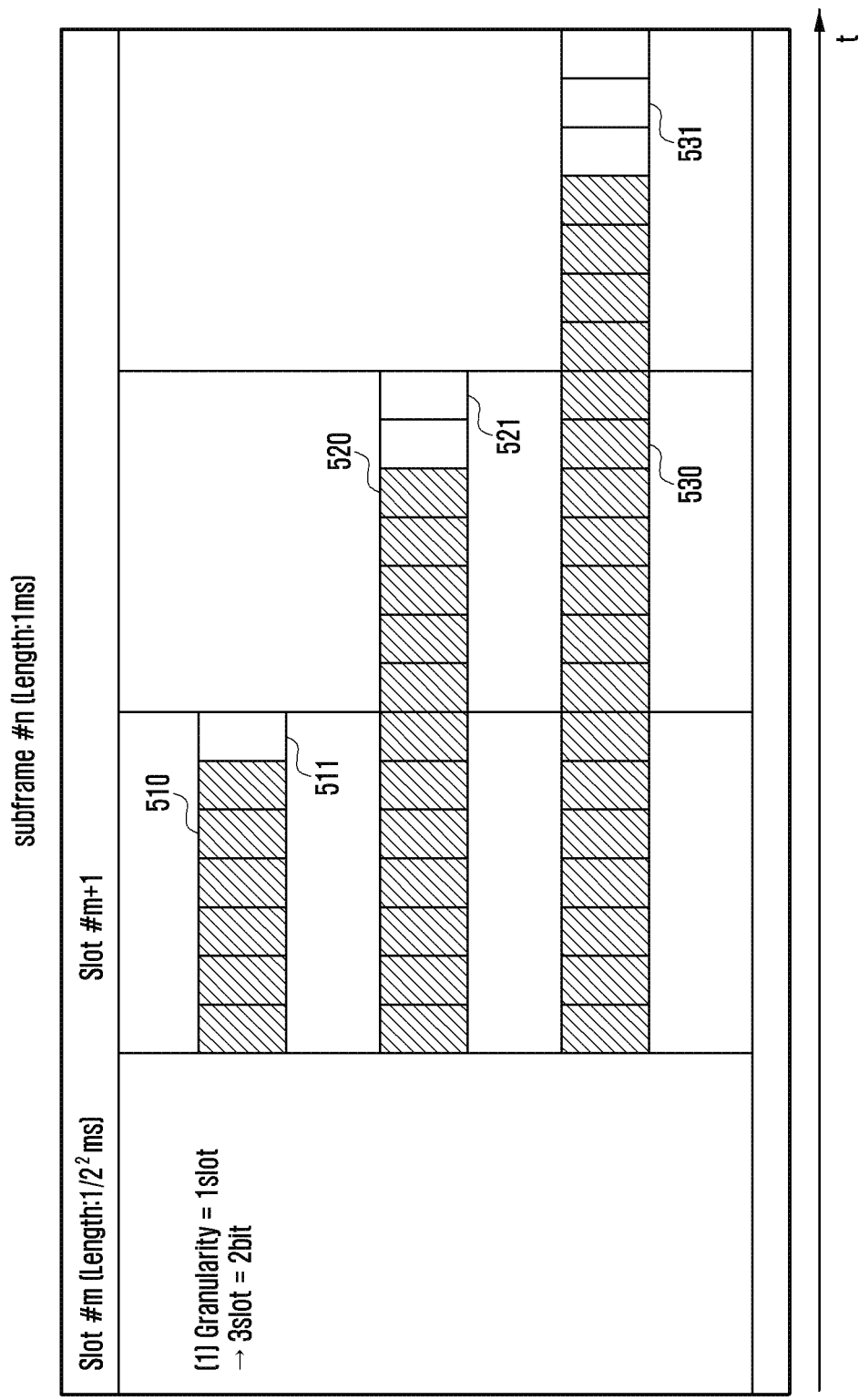
FIG. 5 depicts a scheme for transmitting RACH preamble format information to a terminal according to another embodiment of the present disclosure.

FIG. 5 depicts a scheme for transmitting RACH preamble format information to the terminal according to another embodiment of the present disclosure.

As an option, it is possible to use the number of slots through which the PRACH preamble is transmitted. That is, the base station may use the number of slots to notify the terminal of the number of repetitions of the preamble sequence.

In FIG. 5, the base station may notify the terminal of the length of the slot through which the PRACH is transmitted.

Here, the base station may determine the number of bits for representing the maximum number of slots used for transmission and notify the terminal of the slot length through the bit information. For example, if the maximum number of slots used for transmission is three, the base station can notify the terminal of the slot length for PRACH transmission by using 2-bit information. Specifically, bit information 00 may indicate that the length of the slot is 1; bit information 01 may indicate that the length of the slot is 2; and bit information 10 may indicate that the length of the slot is 3.

In this case, the base station may determine the length of the slot through which the PRACH is transmitted according to the size of the cell, and may transmit the bit information indicating the slot length to the terminal via system information or higher layer signaling.

In addition, when two or more subcarrier spacing values for the PRACH are set, the base station may transmit the RACH configuration including information on the lengths of the slots associated with the individual subcarrier spacing values for PRACH transmission.

Hence, the terminal can determine the number of preamble repetitions according to the length of the slot. For example, when one slot is used for PRACH transmission, the terminal may repeat the preamble sequence of a six-symbol length once and transmit it to the base station as indicated by indicia 510. When two or more slots are used for PRACH transmission, the terminal may repeat the preamble sequence two or more times and transmit it to the base station as indicated by indicia 520 or 530.

In FIG. 5, indicia 510 indicates that the preamble having a length of six symbols is repeated once and transmitted to the base station, and indicia 520 indicates that the preamble having a length of six symbols is repeated twice and transmitted to the base station. Here, the CP length is omitted in the figure.

Additionally, the terminal can determine the GT included in the PRACH according to the length of the slot used for PRACH transmission. For example, when one slot is used for PRACH transmission, the terminal may use one unit of GT. When two or more slots are used to transmit the PRACH, the terminal may use two or more units of GT. Here, one GT unit can be determined to be the length of one symbol, the length of two or more symbols, or a specific time value. The length of one GT unit may be equal to or related to the symbol length (or, PRACH symbol) during which the PRACH preamble is transmitted, or may be determined independently of the symbol length of the PRACH preamble.

If the number of PRACH symbols specified by the base station exceeds the length of one slot, the terminal may transmit the PRACH using one or more slots, where the remaining portion of the last slot can be regarded as a GT. If the number of symbols in the PRACH sequence specified by the base station is smaller than the number of symbols included in one slot, the remaining portion of the slot excluding the symbols of the PRACH sequence can be regarded as a GT. In FIG. 5, in the case of transmitting the PRACH through one slot as indicated by indicia 510, one unit of GT is included as indicated by indicia 511. In the case of transmitting the PRACH through two slots as indicated by indicia 520, two units of GT are included as indicated by indicia 521. In the case of transmitting the PRACH through three slots as indicated by indicia 530, three units of GT are included as indicated by indicia 531.

Here, in FIG. 5, the number of PRACH symbols constituting the slot is assumed to be 7. However, the number of PRACH symbols may be set to 14 or another number. As described before, the PRACH symbol may refer to the time length or time resource used to transmit the RACH preamble one time.

Figure 6:
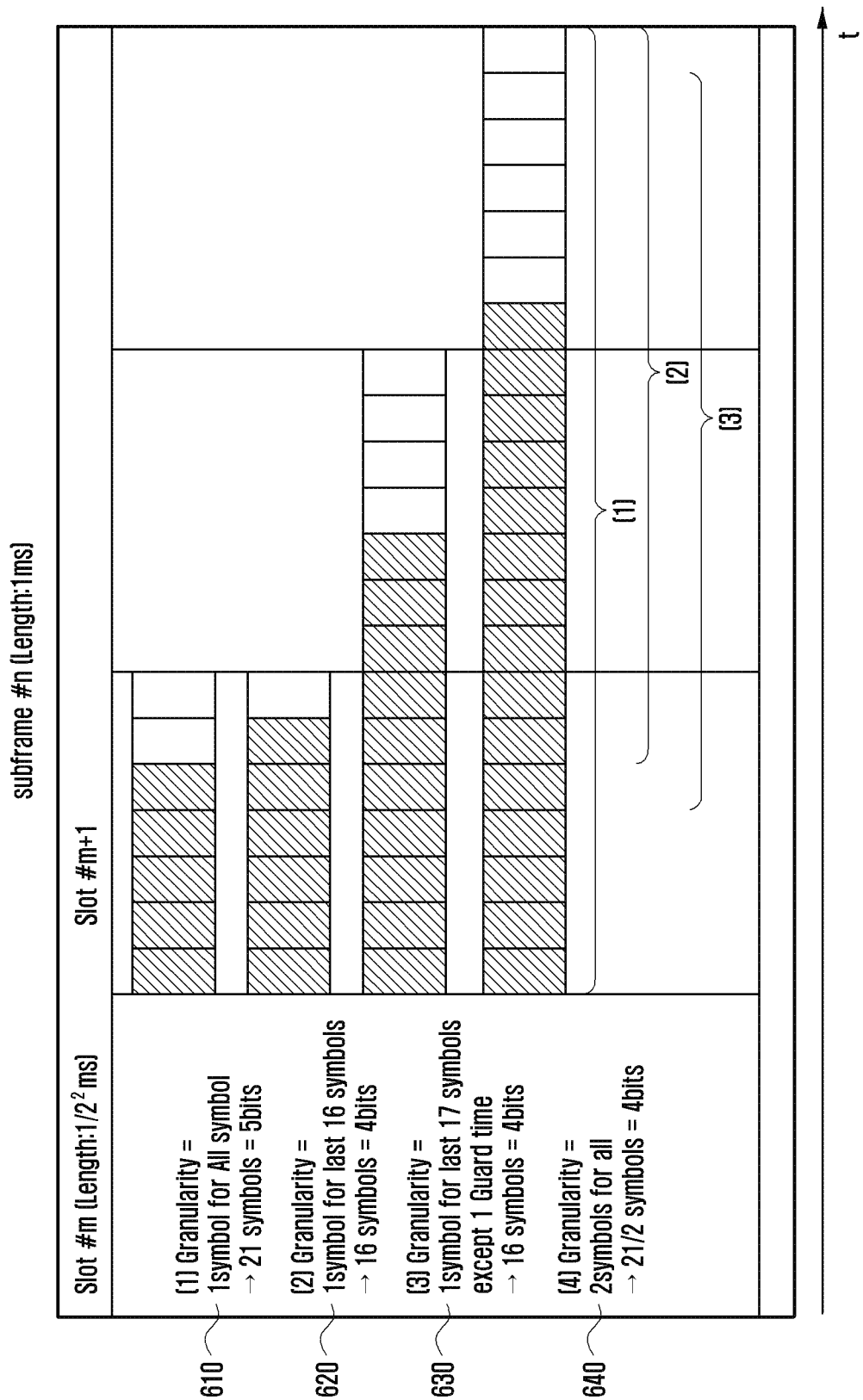
FIG. 6 depicts another scheme for transmitting RACH preamble format information to a terminal according to another embodiment of the present disclosure.

FIG. 6 depicts another scheme for transmitting RACH preamble format information to the terminal according to another embodiment of the present disclosure.

As another option, the base station may notify the terminal of the number of PRACH symbols used to transmit the PRACH preamble.

In FIG. 6, the base station can notify the terminal of the length of PRACH symbols used to transmit the PRACH. That is, unlike FIG. 5 where the number of preamble repetitions is notified via the slot length, the number of symbols used to transmit the PRACH may be directly notified in FIG. 6. The terminal can identify the number of preamble repetitions based on the length of the preamble and the number of symbols used to transmit the RPACH. Here, as in FIG. 5, the length of CP is omitted in FIG. 6.

In scheme (1) indicated by indicia 610, the number of PRACH symbols used to transmit the PRACH is indicated for all the symbols of the entire slot during which the PRACH can be transmitted.

If the PRACH can be transmitted over 3 slots and one slot is composed of seven symbols, a total of 21 symbols may be used to transmit the PRACH.

Then, the base station can notify the terminal of the number of symbols used to transmit the PRACH by using 5 bits. The base station can transmit this information to the terminal through RRC signaling or system information. Alternatively, a PRACH configuration table can be used.

In scheme (2) indicated by indicia 620, assuming that the PRACH can be transmitted over 3 slots and one slot is composed of seven symbols, the first five symbols are used by default to transmit the PRACH and the remaining 16 symbols are indicated as the number of PRACH symbols for PRACH transmission.

That is, the first several symbols constituting the slot are assumed to be used for PRACH transmission. Except for the symbols used by default for PRACH transmission, the number of PRACH symbols to be additionally used for PRACH transmission is notified. Here, the number of symbols used by default for PRACH transmission may be determined in advance, or may be notified by the base station to the terminal via system information or RRC signaling.

In this case, the number of PRACH symbols to be additionally used may be determined to be $2^n$ (a power of two). For example, in this scheme, the base station can indicate the number of PRACH symbols by using 4 bits. The base station can transmit this information to the terminal through RRC signaling or system information. Alternatively, a PRACH configuration table can be used.

Scheme (3) indicated by indicia 630 is identical to above scheme (2) except that the end of the slot for PRACH transmission is used for the GT.

For example, the last symbol is used for GT, the first four symbols can be used by default for PRACH transmission, and the base station can notify the number of symbols to be used to transmit the PRACH for the remaining 16 symbols. As described above, the number of symbols used by default for PRACH transmission and the number of symbols used for the GT may be determined in advance, or may be notified by the base station to the terminal via system information or RRC signaling.

If the number of PRACH symbols specified by the base station exceeds the length of one slot, the terminal may transmit the PRACH using one or more slots, where the remaining portion of the last slot can be regarded as a GT. If the number of symbols in the PRACH sequence specified by the base station is smaller than the number of symbols included in one slot, the remaining portion of the slot excluding the symbols of the PRACH sequence can be regarded as a GT.

In this case, the variable number of PRACH symbols notified by the base station may be determined to be $2^n$. For example, in this scheme, the base station can indicate the number of PRACH symbols by using 4 bits. The base station can transmit this information to the terminal through RRC signaling or system information. Alternatively, a PRACH configuration table can be used.

In scheme (4) indicated by indicia 640, all the symbols of the entire slot during which the PRACH can be transmitted are divided into units and each unit is indicated.

For example, every two symbols can be indicated as a unit. If the PRACH can be transmitted over 3 slots and the number of symbols constituting one slot is 7, the base station may notify the terminal of the number of PRACH symbols for a total of 21/2 cases. Here, the base station can notify the terminal of how many symbols constitute one unit through system information or RRC signaling.

For instance, the base station can indicate the number of PRACH symbols by using 4 bits. The base station can transmit this information to the terminal through RRC signaling or system information. Alternatively, a PRACH configuration table can be used.

Scheme (4) may be used together with scheme (2) or scheme (3). That is, the number of PRACH symbols may be indicated in units of two symbols after excluding the first several symbols or the first several symbols and the GT symbols as in scheme (2) or scheme (3).

The base station may also indicate the number of PRACH symbols in units of two or more symbols.

If the number of PRACH symbols specified by the base station exceeds the length of one slot, the terminal may transmit the PRACH using one or more slots, where the remaining portion of the last slot can be regarded as a GT. If the number of symbols in the PRACH sequence specified by the base station is smaller than the number of symbols included in one slot, the remaining portion of the slot excluding the symbols of the PRACH sequence can be regarded as a GT.

Additionally, it is possible to determine the GT included in the PRACH according to the slot length. For example, when one slot is used to transmit the PRACH, the terminal may use one unit of GT; and when two or more slots are used to transmit the PRACH, the terminal may use two or more units of GT. Here, one unit of GT may be determined to be the length of one symbol, the length of two or more symbols, or a preset time value. The length of one GT unit may be equal to or related to the symbol length of the PRACH preamble, and may be determined independently of the PRACH symbol length. Here, in FIG. 6, the number of PRACH symbols constituting the slot is assumed to be 7. However, the number of PRACH symbols may be set to 14 or another number.

Figure 7:
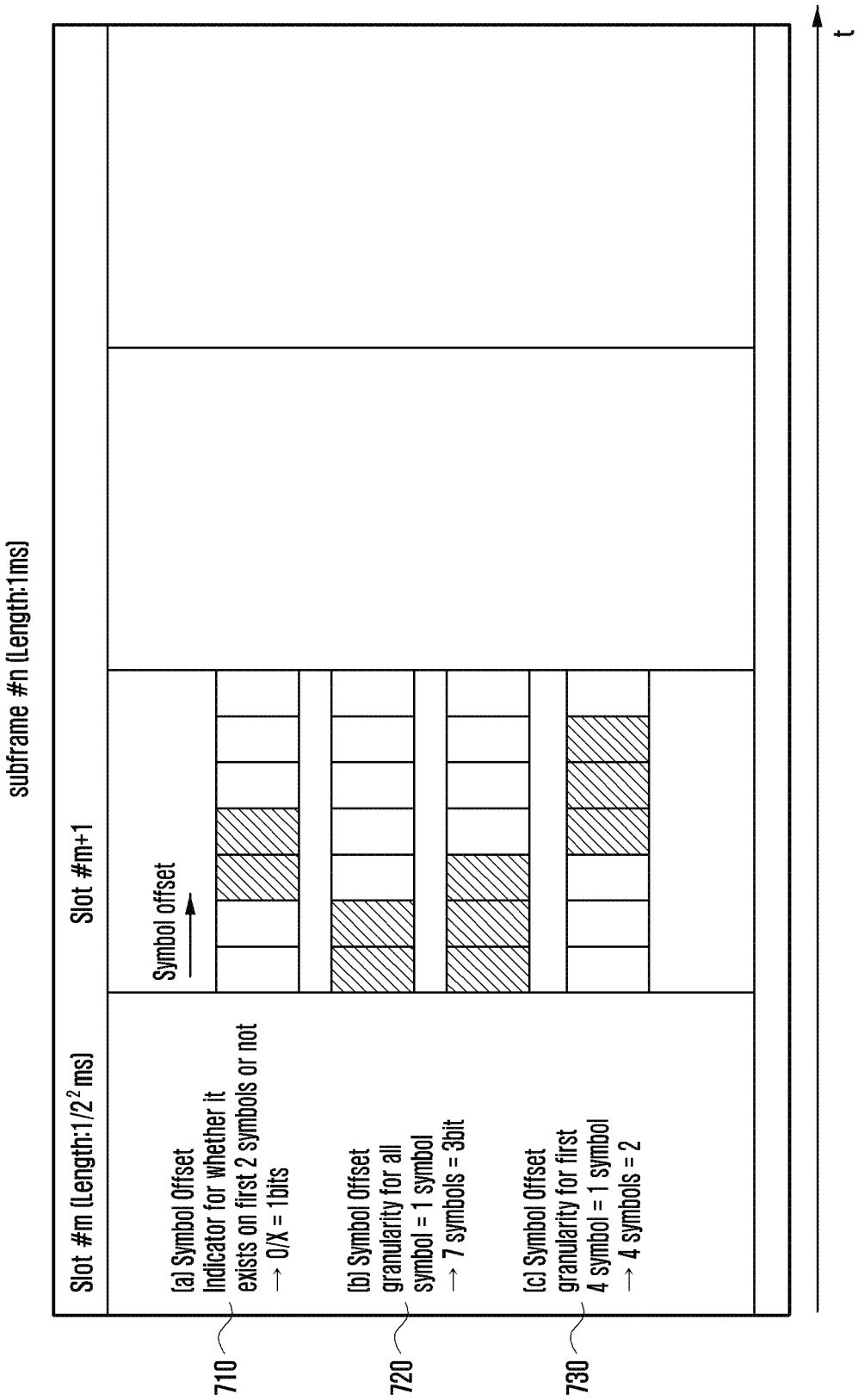
FIG. 7 depicts another scheme for transmitting RACH preamble format information to a terminal according to another embodiment of the present disclosure.

FIG. 7 depicts another scheme for transmitting RACH preamble format information to the terminal according to another embodiment of the present disclosure.

In another embodiment, when the PRACH is transmitted during an interval shorter than the length of one slot, the base station can set a symbol offset indicating the start of PRACH transmission within one slot.

For example, the symbol offset may be used to distinguish a terminal based on a terminal-specific signal. As another example, the terminal can randomly select a symbol offset and use it as an additional factor to distinguish the PRACH.

Specifically, in scheme (a) indicated by indicia 710, the PRACH symbol offset value is set in advance, and the base station notifies the terminal whether the symbol offset is applied.

For example, when the symbol offset is preset to 2, the base station may notify whether the symbol offset is applied by using 1 bit. As an option, the symbol offset enable bit can be used in the RACH configuration (table below).

| PRACH Configuration Index | PRACH format (# of Repetition) | Symbol Offset Enable | System frame number | Subframe number | Length of PRACH | SLOT number | PRACH subset (Freq. Offset) |
|---|---|---|---|---|---|---|---|
| 0~M | 0~N_1 (symbol) 0~N_2 (Slot) | O/X | Even/Odd | 1 | 0~1 0 = 839, 1 = (63/71/127/139) | 0~n (Or Even/Odd) | 1~P |

Here, information on the preset symbol offset and information indicating whether to apply the symbol offset may be transmitted to the terminal through system information or RRC signaling.

When the terminal randomly selects the symbol offset value, it is possible to reflect this information in the RA-RNTI. That is, the terminal and the base station can generate the RA-RNTI on the basis of the time index for PRACH transmission determined according to the symbol offset value.

In scheme (b) indicated by indicia 720, the base station notifies the terminal of the PRACH symbol offset for all the symbols included in the slot.

For example, if the slot includes 7 symbols, the base station can notify the terminal of the symbol offset value by using 3 bits.

When the terminal randomly selects the symbol offset value, it is possible to reflect this information in the RA-RNTI. In this case, the symbol unit may be set based on the SCS of the existing SS block or on the PRACH symbol.

Here, the information on the symbol offset may be transmitted to the terminal via system information or RRC signaling.

In scheme (c) indicated by indicia 730, the interval available to the PRACH symbol offset is set in advance, and the base station notifies the terminal of the symbol offset in units of symbols for the interval.

For example, if the slot includes seven symbols and the symbol offset can be set for up to four symbols, the base station can notify the terminal of the symbol offset only for an interval of four symbols. Hence, the base station may notify the terminal of the symbol offset by using 2 bits. In this case, the symbol unit may be set based on the SCS of the existing SS block or on the PRACH symbol.

Here, the information on the symbol offset may be transmitted to the terminal through system information or RRC signaling.

The RACH format described above may be determined according to the characteristics of the cell and may be broadcast. In the RRC connected state, the RACH format may be designated differently according to scheduling of the terminal. Then, the terminal can perform PRACH transmission with priority given to the scheduled information.

Meanwhile, the above-described PRACH transmission method can be used for both a single-beam case and a multi-beam case.

Figure 8:
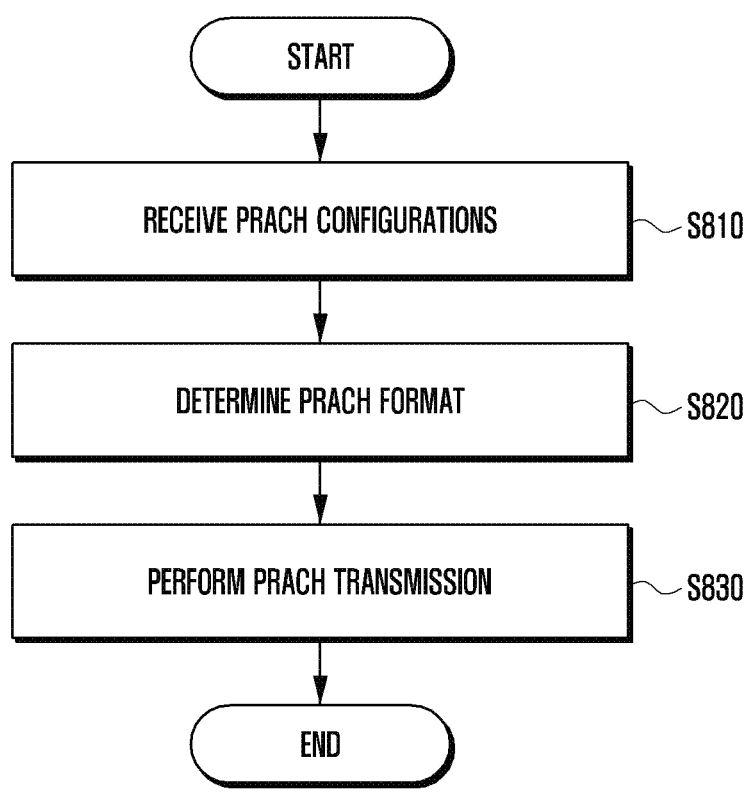
FIG. 8 illustrates a flowchart of a scheme for the terminal to receive preamble format information according to another embodiment of the present disclosure.

FIG. 8 illustrates a flowchart of a scheme for the terminal to receive preamble format information according to another embodiment of the present disclosure.

With reference to FIG. 8, at step S810, the terminal may receive PRACH configuration information. As described before, information on the slot length, information on the number of PRACH symbols can be included in the PRACH configuration information transmitted to the terminal. As described above, these information may also be transmitted via system information or RRC signaling.

At step S820, the terminal may determine the PRACH format.

The terminal can determine the PRACH format based on the PRACH configuration information. Specifically, the terminal can determine the number of repetitions of the preamble sequence and the length of the CP based on the PRACH configuration information, and determine the length of the preamble based on the results of the previous determination. The method for the base station to transmit information regarding the number of repetitions of the preamble sequence and the length of the CP to the terminal is the same as described before, and the terminal can identify such information based on the PRACH configuration information.

In addition, if a timing offset is set, the terminal can identify the offset value based on the PRACH configuration information. The method for the base station to transmit the offset value to the terminal is the same as described before.

After determining the PRACH format, at step S830, the terminal may transmit the PRACH.

Meanwhile, for PRACH transmission, the base station should determine the frequency resource to be used for PRACH transmission and notify the terminal of the determined frequency resource. Next, a description is given of a scheme for determining the frequency resource to be used for PRACH transmission and notifying the terminal of the determined frequency resource.

In the following description, the RACH resource is defined as the time/frequency resource used to transmit the RACH preamble. The terminal may identify the RACH resource based on the information included in the synchronization block (SS block).

The details of determining the RACH resource using the information included in the synchronization block are as follows.

For the 5G network, minimum system information (minimum SI) may be defined, and the minimum SI may contain information necessary for the initial access procedure. Specifically, the minimum SI may include at least some of the information included in the MIB, SIB1, and SIB2.

Hence, the base station may transmit at least a portion of the minimum SI to the terminal through the PBCH of the SS block. The minimum SI information included in the PBCH may include information on at least the system frame number.

The terminal may identify the PDCCH based on the information obtained through the PBCH of the SS block and may obtain the remaining minimum SI not included in the PBCH by receiving the PDCCH and the PDSCH.

To this end, the information transmitted through the PBCH to the terminal may include PDCCH information associated with the remaining minimum SI. The PDCCH information may include resource information of the PDSCH through which the remaining minimum SI is transmitted.

Thereby, the terminal can identify the RACH configuration information (RACH resource related information) based on the information included in the SS block.

Figure 9:
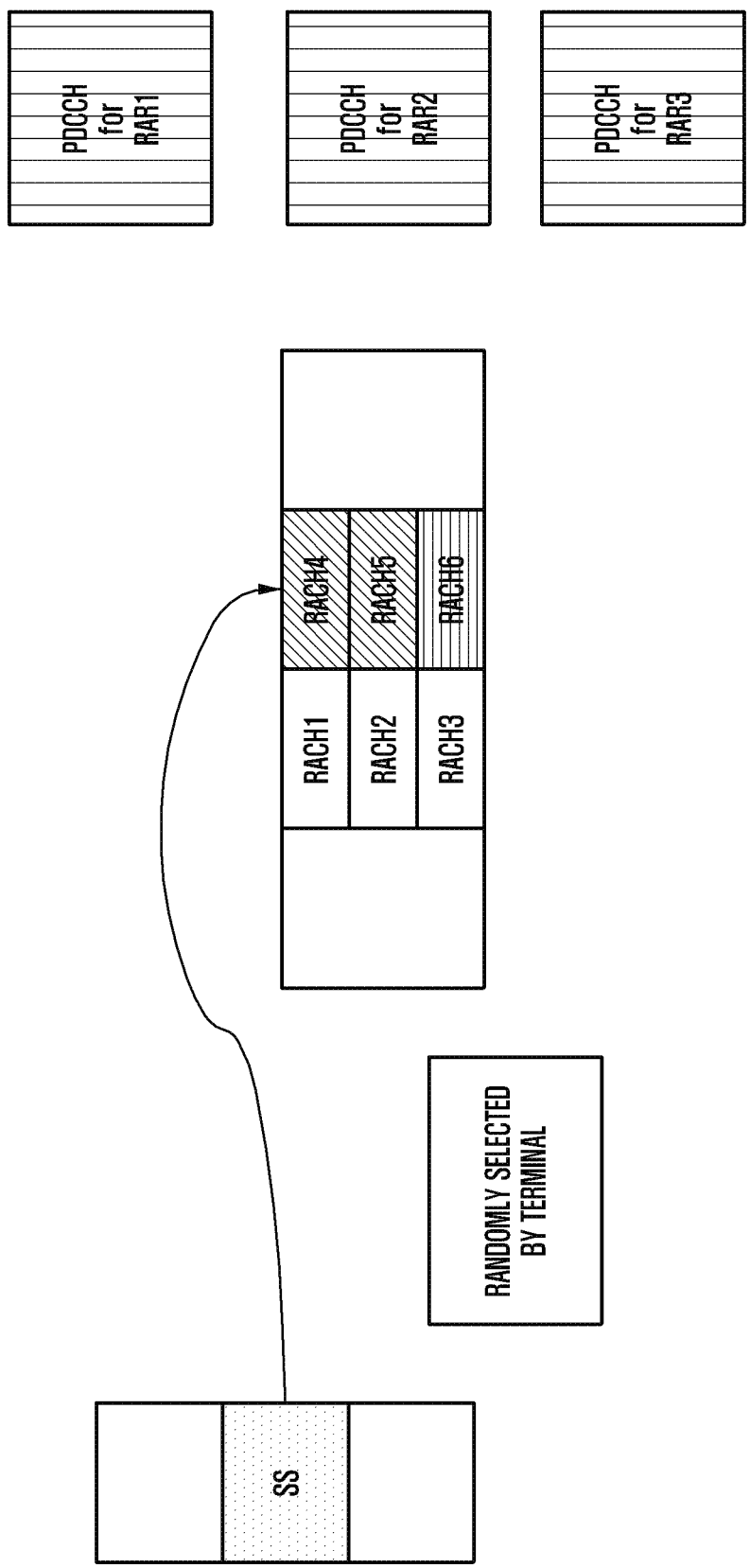
FIG. 9 depicts a scheme for determining the RACH resource according to another embodiment of the present disclosure.

FIG. 9 depicts a scheme for determining the RACH resource according to another embodiment of the present disclosure.

In one embodiment, the time resource among the RACH resources is determined using the information included in the synchronization block (SS block), and the frequency resource can be randomly determined by the terminal.

Here, the frequency resource for transmitting the RACH may be separated, and the base station may notify the terminal of information on the separated frequency resource. For example, the frequency resources can be divided into a preset number of sub-bands, and the base station can notify the terminal of the sub-bands.

The base station can also notify the terminal of the time resource at which the RACH is to be transmitted. However, if the base station does not configure the time resource information, the terminal may transmit the RACH at any time resource of the corresponding frequency resource or at a randomly selected time resource.

Here, the frequency and time information may be transmitted to the terminal through the information included in the SS block or RRC signaling.

Accordingly, the terminal can randomly select one of the separated frequencies.

With reference to FIG. 9, the base station may determine the time resource including RACH 4, RACH 5 and RACH 6 among the RACH resources as the time resource to be used for RACH transmission. The base station may also transmit the terminal information indicating that the RACH resources are divided into RACH 4, RACH 5 and RACH 6 along the frequency axis. Hence, the terminal may select one of RACH 4, RACH 5 and RACH 6 and transmit the RACH preamble to the base station using the selected resource.

In another embodiment of determining the slot by the terminal, the relationship between the services supported by the base station and the RACH resources may be notified by the base station or may be set in advance. The terminal can determine the RACH resource according to the service that the terminal wishes to receive on the basis of the information about the relationship between the services supported by the base station and the RACH resources.

When the terminal determines the frequency resource among the RACH resources, the frequency information may be reflected in calculation of the RA-RNTI. That is, the frequency resource of the RACH resources can be used to determine the RA-RNTI.

Additionally, the terminal may decode the PDCCH at the same frequency resource as the resource used to transmit the RACH and receive a random access response message (RAR message) from the base station. The terminal may also decode the PDCCH at the same frequency resource determined based on the resource used to transmit the RACH and receive a RAR message. Here, the relationship between the resource used to transmit the RACH and the resource used to receive the RAR message may be determined in advance or may be determined by the base station. The base station may notify the terminal of the relationship between the resource used to transmit the RACH and the resource used to receive the RAR message through RRC signaling or system information.

Figure 10:
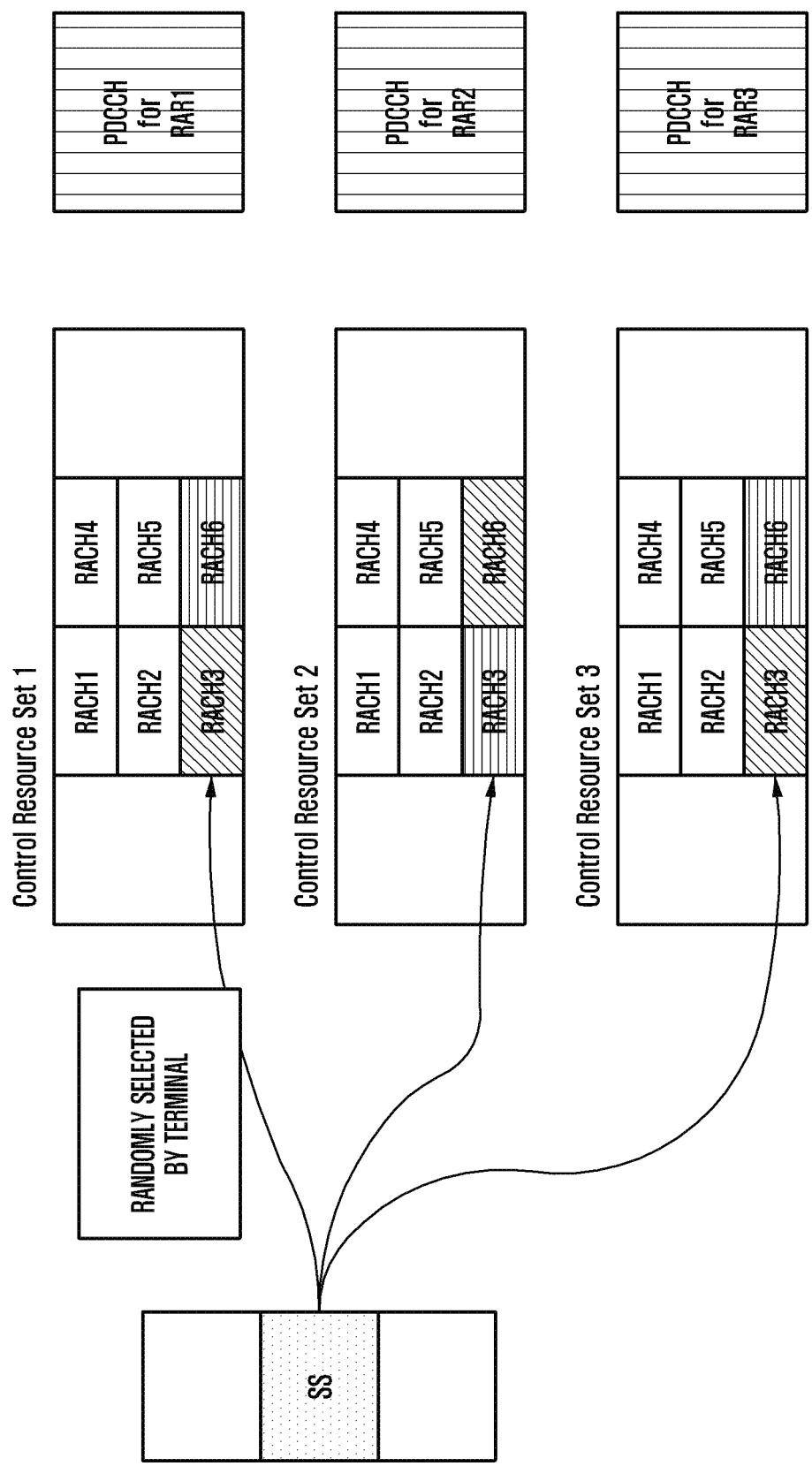
FIG. 10 depicts another scheme for determining the RACH resource according to another embodiment of the present disclosure.

FIG. 10 depicts another scheme for determining the RACH resource according to another embodiment of the present disclosure.

As described before, it is possible to determine the frequency and/or time resources among the RACH resources by using the information included in the SS block. As shown in FIG. 10, the RACH resource that can be determined using the information included in the SS block may be present in each control resource set.

Specifically, in this embodiment, the base station can divide one band into a given number of sub-bands and notify this to the terminal. Here, one sub-band may be referred to as a control resource set.

Accordingly, the terminal can randomly select one of the one or more accessible control resource sets to transmit the RACH signal.

The base station can transmit the terminal configuration information about each control resource set and information on the resource to be used for RACH transmission in the control resource set. Here, the information on the resource to be used for RACH transmission may include frequency information only or include both frequency information and time information. When the information on the resource to be used for RACH transmission includes frequency information only, the terminal may randomly select a time resource to transmit the RACH.

As described before, the base station can transmit the above information to the terminal by use of the information included in the SS block. Alternatively, the base station may transmit the above information to the terminal through RRC signaling, and may also transmit only some of the above information to the terminal through RRC signaling.

For example, with reference to FIG. 10, the base station can divide the frequencies useable for PRACH transmission into control resource sets 1, 2 and 3, and notify this to the terminal. The base station can also notify the terminal of information about the resource to be used for RACH transmission (RACH 3, RACH 6) in each control resource set.

Then, the terminal may select one of the control resource sets and transmit the RACH at the RACH resource in the selected control resource set. Here, the terminal may transmit the RACH by using two time resources as shown in FIG. 10, and can also transmit the RACH by using one of the two time resources. In this case, the base station may notify the terminal of the time resource to be used, or the terminal may randomly select the time resource to be used.

The information related to the RACH resources (e.g., information on the control resource sets, time information and frequency information of the RACH resource in a control resource set) can be transmitted by the base station to the terminal by use of the information included in the SS block as described before. Alternatively, the above information may be transmitted through RRC signaling, and only some of the above information may be transmitted through RRC signaling.

In another embodiment, the relationship between the services supported by the base station and the control resource sets may be notified by the base station to the terminal, or may be determined in advance. Hence, the terminal may determine the control resource set according to the service that it wishes to receive on the basis of the information about the relationship between the services supported by the base station and the control resource sets.

In this case, the RAR information, which is a response to the transmitted RACH, can be received through the PDCCH configured in the corresponding control resource set and the PDSCH associated therewith. The RACH resource used by the terminal for transmission and the PDCCH carrying the RAR may be located at the same frequency.

In another embodiment, the relationship between the RACH resource and the RAR may be notified by the base station to the terminal (e.g., broadcast), or may be determined in advance.

Then, the terminal can receive the RAR by monitoring the PDCCH at the same frequency resource as the RACH resource used to transmit the RACH. Alternatively, the terminal can receive the RAR by monitoring the PDCCH at the frequency resource through which the RAR is to be transmitted on the basis of the information about the relationship between the RACH resource and the RAR.

Figure 11:
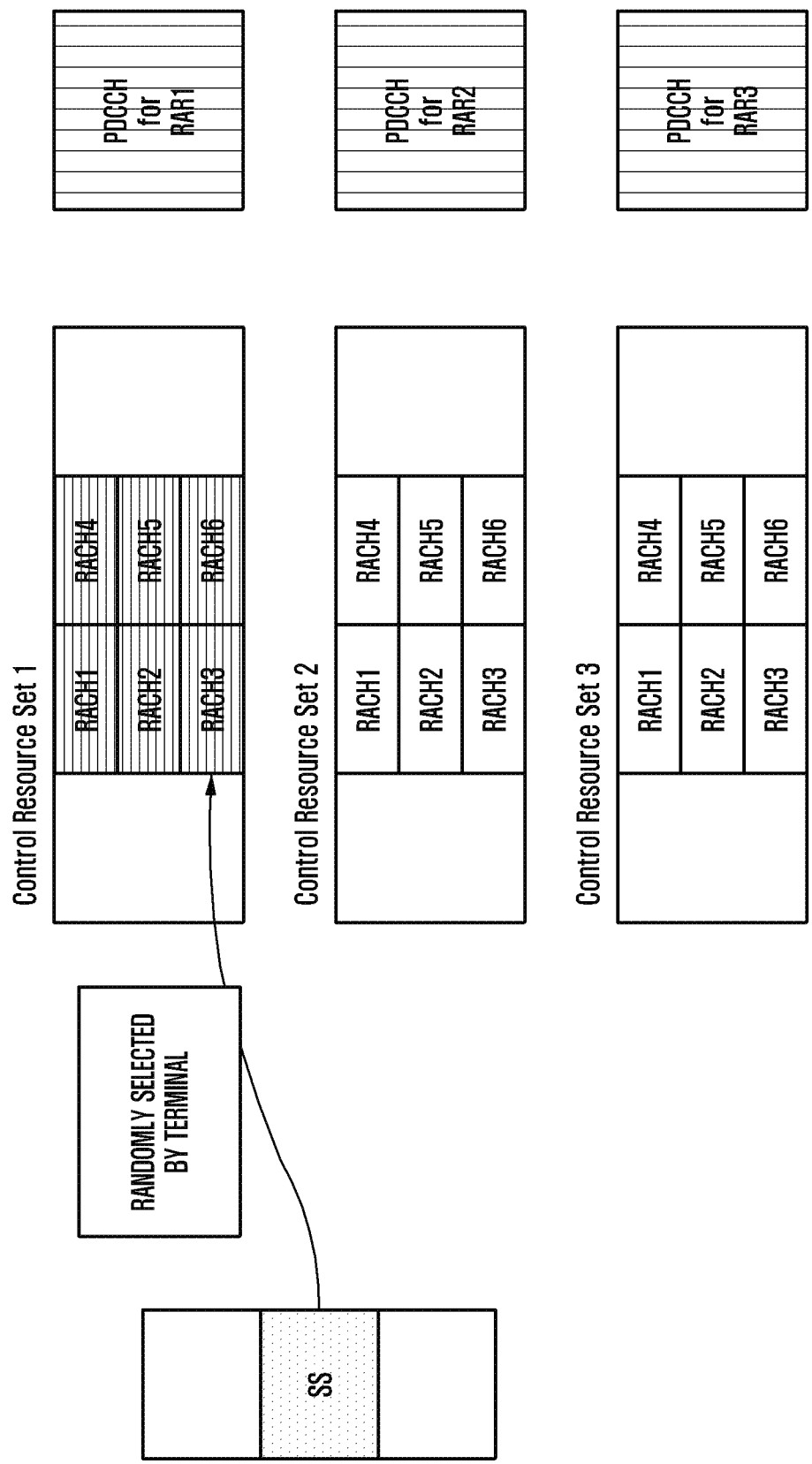
FIG. 11 depicts another scheme for determining the RACH resource according to another embodiment of the present disclosure.

FIG. 11 depicts another scheme for determining the RACH resource according to another embodiment of the present disclosure.

As described before, it is possible to determine the control resource set among the RACH resources by using the information included in the SS block. Here, a group of RACH resources associated with each control resource set may be determined in advance.

The base station can select one of plural control resource sets and notify the terminal of the selected control resource set. Then, the terminal may select a RACH resource from the notified control resource set and transmit the RACH using the selected RACH resource. Alternatively, the terminal may select a RACH resource from the RACH resource group in the notified control resource set and transmit the RACH using the selected RACH resource.

Here, information about the control resource set configuration and information about the RACH resource group may be transmitted to the terminal through the information included in the SS block. Alternatively, the base station may transmit the above information to the terminal through RRC signaling, and may also transmit only some of the above information to the terminal through RRC signaling.

In another embodiment, the relationship between the services supported by the base station and the RACH resources may be notified by the base station to the terminal, or may be determined in advance. Hence, the terminal may determine the RACH resource according to the service that it wishes to receive on the basis of the information about the relationship between the services supported by the base station and the RACH resources.

When the terminal determines the frequency resource among the RACH resources, the frequency information may be reflected in calculation of the RA-RNTI.

In another embodiment, the terminal can determine the control resource set or RACH resource group and the transmission timing (subframe unit or slot unit) by use of the SS block. In this case, the RAR information, which is a response to the transmitted RACH, can be received through the PDCCH configured in the corresponding control resource set and the PDSCH associated therewith. The RACH resource used by the terminal for transmission and the PDCCH carrying the RAR may be located at the same frequency.

In another embodiment, the relationship between the RACH resource and the RAR may be notified by the base station to the terminal (e.g., broadcast), or may be determined in advance.

Then, the terminal can receive the RAR by monitoring the PDCCH at the same frequency resource as the RACH resource used to transmit the RACH. Alternatively, the terminal can receive the RAR by monitoring the PDCCH at the frequency resource through which the RAR is to be transmitted on the basis of the information about the relationship between the RACH resource and the RAR.

Figure 12:
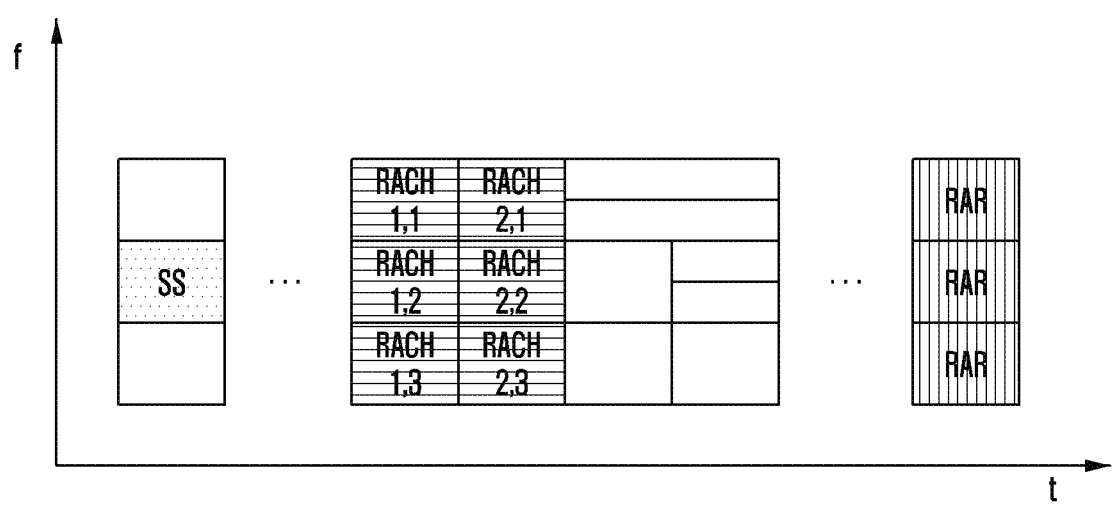
FIG. 12 depicts another scheme for determining the RACH resource according to another embodiment of the present disclosure.

FIG. 12 depicts another scheme for determining the RACH resource according to another embodiment of the present disclosure.

As described before, the control resource set by which the terminal transmits the PRACH can be determined based on the information included in the SS block. The terminal can identify one RACH resource that can be used to transmit the PRACH from the control resource set.

In another embodiment, only the frequency component can be determined as one value. The terminal can randomly select the timing for PRACH transmission, and this information can be reflected in the RA-RNTI. The terminal can determine the time information of the RACH resource according to the service that it wishes to receive. In this case, the RAR information, which is a response to the transmitted RACH, can be received through the PDCCH configured in the corresponding control resource set and the PDSCH associated therewith. The RACH resource used by the terminal for transmission and the PDCCH carrying the RAR may be located at the same frequency.

In another embodiment, the relationship between the RACH resource and the RAR may be notified by the base station to the terminal (e.g., broadcast), or may be determined in advance.

Then, the terminal can receive the RAR by monitoring the PDCCH at the same frequency resource as the RACH resource used to transmit the RACH. Alternatively, the terminal can receive the RAR by monitoring the PDCCH at the frequency resource through which the RAR is to be transmitted on the basis of the information about the relationship between the RACH resource and the RAR.

Figure 13:
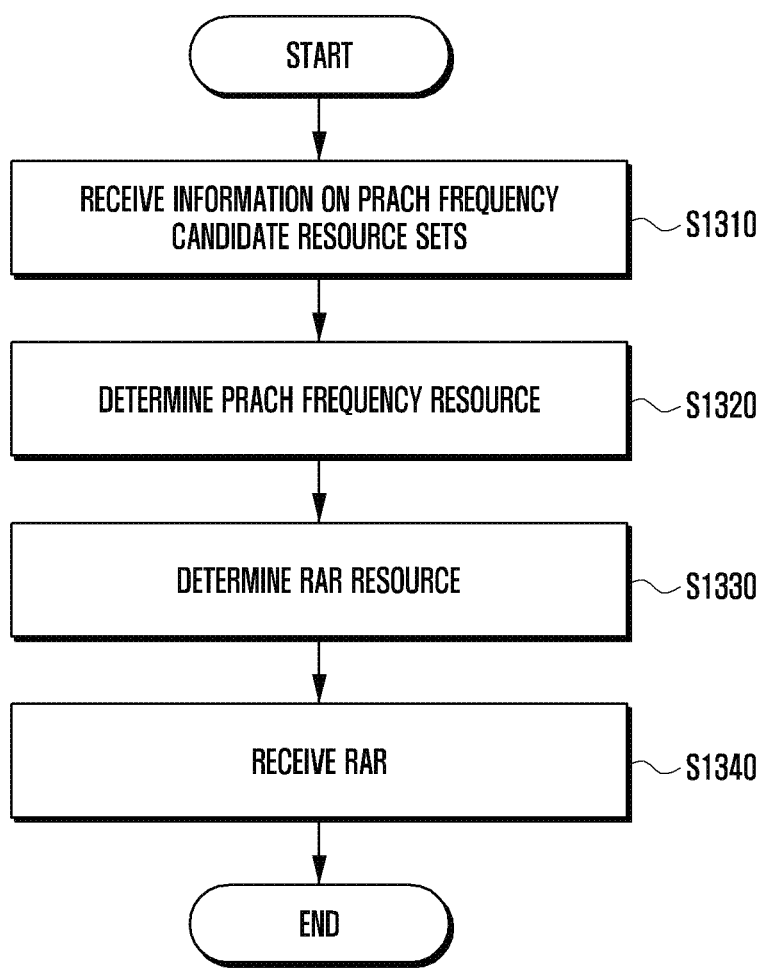
FIG. 13 illustrates a flowchart of a scheme for the terminal to perform the RACH procedure according to another embodiment of the present disclosure.

FIG. 13 is a flowchart of a scheme for the terminal to perform the RACH procedure according to another embodiment of the present disclosure.

With reference to FIG. 13, at step S1310, the terminal may receive information on the PRACH frequency candidate resource sets.

Here, the PRACH frequency candidate resource set information can be determined by dividing one frequency band into a preset number of pieces. The RACH resource usable by the terminal for RACH transmission may be present in each PRACH frequency candidate resource set or may be present in only one PRACH frequency candidate resource set.

At step S1320, the terminal may determine the PRACH frequency resource to be used for RACH transmission.

The terminal may select one of the PRACH frequency candidate resource sets and determine the PRACH frequency resource from the selected PRACH frequency candidate resource set. Here, the terminal may randomly select a PRACH frequency resource.

At step S1330, the terminal may identify the RAR frequency resource.

The PRACH frequency resource and the PDCCH frequency resource carrying the RAR may be the same or related. If the PRACH frequency resource and the PDCCH frequency resource carrying the RAR are related, the terminal may receive in advance information on the relationship therebetween. Hence, the terminal may identify the RAR frequency resource on the basis of the same resource as the resource used to transmit the PRACH, the same frequency resource as the resource used to transmit the PRACH, or the resource used to transmit the PRACH and the above relationship information.

Thereafter, at step S1340, the terminal may receive a RAR.

The terminal may monitor the PDCCH of the RAR frequency resource and decode the PDCCH to identify the location of the resource through which the RAR is to be transmitted. Hence, the terminal may receive a RAR through the identified resource.

Figure 14:
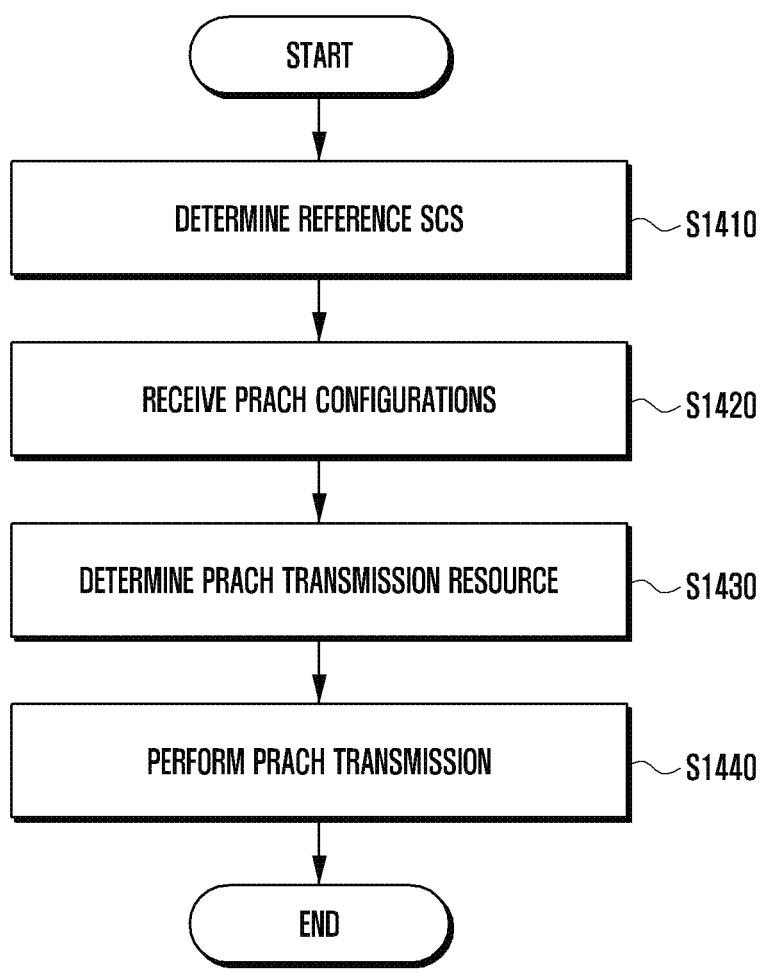
FIG. 14 is a flowchart illustrating the overall operation of the terminal according to an embodiment of the present disclosure.

FIG. 14 illustrates a flowchart illustrating the overall operation of the terminal according to an embodiment of the present disclosure.

With reference to FIG. 14, at step S1410, the terminal may determine the reference subcarrier spacing. As described before, the terminal can determine the subcarrier spacing of the synchronization block according to the range of the operating frequency, and can determine the reference subcarrier spacing based on the subcarrier spacing of the synchronization block.

At step S1420, the terminal may receive PRACH configuration information. The PRACH configuration information may include a PRACH configuration index, which may indicate the subframe index, slot offset information, and the like. The subframe index and slot offset information may be used by the terminal to determine slot information.

The PRACH configuration information may also include PRACH format information, such as information regarding the length of the slot in which the PRACH preamble is to be transmitted, the number of PRACH symbols, and the offset value. The terminal can determine the number of repetitions of the preamble sequence and CP/GT information based on the above information. The preset values described before may also be included in the PRACH configuration information.

In addition, the PRACH configuration information may include information on the PRACH frequency candidate resource sets. The terminal may determine a RACH resource included in one of these sets.

At step S1430, the terminal may determine the PRACH transmission resource. The terminal can determine the PRACH transmission resource by use of the subcarrier spacing value and the information included in the PRACH configuration information.

Specifically, the terminal can identify the slot information to be used for PRACH transmission on the basis of the subcarrier spacing value, and the subframe index and slot offset information included in the PRACH configuration information.

In addition, the terminal can determine the RACH resource in one of the PRACH frequency candidate resource sets indicated by the PRACH configuration information.

Thereafter, at step S1440, the terminal may perform PRACH transmission.

The terminal may use information on the slot length or the number of PRACH symbols included in the PRACH configuration information to determine the number of repetitions of the preamble, and the CP/GT information. The terminal may generate a PRACH preamble based on the number of repetitions of the preamble and the CP/GT information, and transmit the generated preamble through the determined PRACH transmission resource.

Then, the terminal can identify the RAR resource based on the frequency resource used for PRACH transmission, and can receive a RAR via the RAR resource.

Specifically, the PRACH frequency resource and the PDCCH frequency resource carrying the RAR may be the same or related. If the PRACH frequency resource and the PDCCH frequency resource carrying the RAR are related, the terminal may receive in advance information on the relationship therebetween. Hence, the terminal may identify the RAR frequency resource on the basis of the same resource as the resource used to transmit the PRACH, the same frequency resource as the resource used to transmit the PRACH, or the resource used to transmit the PRACH and the above relationship information.

Thereafter, the terminal may monitor the PDCCH of the RAR frequency resource and decode the PDCCH to identify the location of the resource through which the RAR is to be transmitted. Hence, the terminal may receive a RAR through the identified resource.

Figure 15:
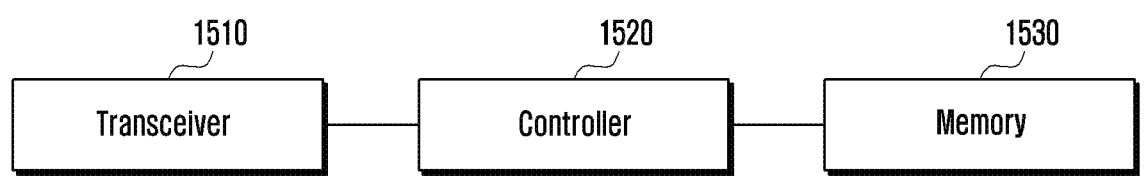
FIG. 15 illustrates a block diagram of a terminal according to the present disclosure.

FIG. 15 illustrates a block diagram of a terminal according to the present disclosure.

As shown in FIG. 15, the terminal may include a transceiver 1510, a controller 1520, and a memory 1530. The controller 1520 may be a circuit, an application specific integrated circuit, or at least one processor.

The transceiver 1510 can transmit and receive signals to and from another network entity. For example, the transceiver 1510 can receive system information from the base station, receive a synchronization signal, and transmit a random access preamble.

The controller 1520 can control the overall operation of the terminal proposed by the present disclosure. For example, the controller 1520 can control the signal flow between individual blocks to perform the operations corresponding to the flowcharts described before.

Specifically, the controller 1520 can identify the reference subcarrier spacing, receive the PRACH configuration information, and determine the resource to be used for PRACH transmission by using the reference subcarrier spacing and the PRACH configuration information.

The controller 1520 can identify the slot information to be used for PRACH transmission on the basis of the subcarrier spacing, and the subframe index and slot offset information included in the PRACH configuration information.

The controller 1520 can determine the RACH resource in one of the PRACH frequency candidate resource sets indicated by the PRACH configuration information. Then, the controller 1520 may transmit the PRACH.

The memory 1530 may store information transmitted or received through the transceiver 1510 and information generated by the controller 1520. For example, the memory 1530 may store the PRACH configuration information received from the base station, the determined reference subcarrier spacing value, and the like.

Figure 16:
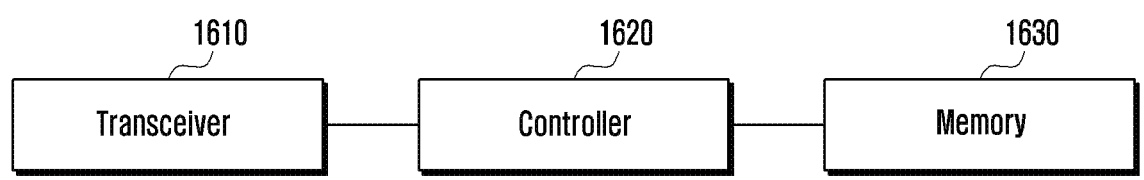
FIG. 16 illustrates a block diagram of a base station according to the present disclosure.

FIG. 16 illustrates a block diagram of a base station according to the present disclosure.

As shown in FIG. 16, the terminal may include a transceiver 1610, a controller 1620, and a memory 1630. The controller 1620 may be a circuit, an application specific integrated circuit, or at least one processor.

The transceiver 1610 can transmit and receive signals to and from another network entity. For example, the transceiver 1610 can transmit system information to the terminal, transmit a synchronization signal, and receive a random access preamble.

The controller 1620 can control the overall operation of the base station proposed by the present disclosure. For example, the controller 1620 can control the signal flow between individual blocks to perform the operations corresponding to the flowcharts described before.

Specifically, the controller 1620 may transmit PRACH configuration information, and receive the PRACH through a resource determined based on the reference subcarrier spacing and the PRACH configuration information.

The memory 1630 may store information transmitted or received through the transceiver 1610 and information generated by the controller 1620. For example, the memory 1630 may store the PRACH configuration information transmitted to the terminal, the information on the resource used for PRACH reception, and the like.

Meanwhile, in the drawings illustrating a method in embodiments, the order of description does not necessarily correspond to the order of execution, and the order relationship may be changed or executed in parallel.

Alternatively, the drawings illustrating the method of the disclosure may omit some of the elements and may include only some of the elements without impairing the essence of the disclosure.

Further, the method of the disclosure may be carried out in combination with some or all of the contents included in each embodiment without departing from the essence of the disclosure.

Hereinabove, embodiments of the present disclosure have been described with reference to the accompanying drawings. Specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a communication system, the method comprising:
    receiving, from a base station, system information including random access channel (RACH) configuration information, the RACH configuration information including a physical RACH (PRACH) configuration index;
    identifying a subcarrier spacing based on the RACH configuration information;
    identifying a resource in which a random access preamble is to be transmitted based on information on a slot in which the random access preamble is to be transmitted and a symbol offset indicating a starting position of the random access preamble in the slot; and
    transmitting, to the base station, the random access preamble based on the resource,
    wherein the information on the slot is based on the PRACH configuration index and the subcarrier spacing, and
    wherein the symbol offset is based on the subcarrier spacing.

2. The method of claim 1, wherein the symbol offset is based on the PRACH configuration index and the subcarrier spacing.

3. The method of claim 1, wherein identifying the resource comprises:
    identifying a frequency resource based on the RACH configuration information; and
    identifying a time resource based on the information on the slot and the symbol offset.

4. The method of claim 1, further comprising:
    receiving, from the base station, a random access response (RAR) identified by a random access-radio network temporary identifier (RA-RNTI).

5. The method of claim 4, wherein the RA-RNTI is based on the information on the slot and the symbol offset.

6. A method performed by a base station in a communication system, the method comprising:
transmitting, to a terminal, system information including random access channel (RACH) configuration information, the RACH configuration information including a physical RACH (PRACH) configuration index; and
receiving, from the terminal, a random access preamble on a resource which is identified based on information on a slot in which the random access preamble is to be transmitted and a symbol offset indicating a starting position of the random access preamble in the slot,
wherein the information on the slot is based on the PRACH configuration index and a subcarrier spacing,
wherein the symbol offset is based on the subcarrier spacing, and wherein the subcarrier spacing is based on the RACH configuration information.

7. The method of claim 6, wherein the symbol offset is based on the PRACH configuration index and the subcarrier spacing.

8. The method of claim 6, further comprising:
transmitting, to the terminal, a random access response (RAR) identified by a random access-radio network temporary identifier (RA-RNTI).

9. The method of claim 8, wherein the RA-RNTI is based on the information on the slot and the symbol offset.

10. A terminal in a communication system, the terminal comprising:
a transceiver; and
a controller coupled with the transceiver and configured to:
control the transceiver to receive, from a base station, system information including random access channel (RACH) configuration information, the RACH configuration information including a physical RACH (PRACH) configuration index,
identify a subcarrier spacing based on the RACH configuration information,
identify a resource in which a random access preamble is to be transmitted based on information on a slot in which the random access preamble is to be transmitted and a symbol offset indicating a starting position of the random access preamble in the slot, and
control the transceiver to transmit, to the base station, the random access preamble based on the resource,
wherein the information on the slot is based on the PRACH configuration index and the subcarrier spacing, and
wherein the symbol offset is based on the subcarrier spacing.

11. The terminal of claim 10, wherein the symbol offset is based on the PRACH configuration index and the subcarrier spacing.

12. The terminal of claim 10, wherein the controller is configured to:
identify a frequency resource based on the RACH configuration information, and
identify a time resource based on the information on the slot and the symbol offset.

13. The terminal of claim 10, wherein the controller is further configured to:
control the transceiver to receive a random access response (RAR) identified by a random access-radio network temporary identifier (RA-RNTI).

14. The terminal of claim 13, wherein the RA-RNTI is based on the information on the slot and the symbol offset.

15. A base station in a communication system, the base station comprising:
a transceiver; and
a controller coupled with the transceiver and configured to:
control the transceiver to transmit system information including random access channel (RACH) configuration information, the RACH configuration information including a physical RACH (PRACH) configuration index, and
control the transceiver to receive a random access preamble on a resource which is identified based on information on a slot in which the random access preamble is to be transmitted and a symbol offset indicating a starting position of the random access preamble in the slot,
wherein the information on the slot is based on the PRACH configuration index and a subcarrier spacing,
wherein the symbol offset is based on the subcarrier spacing, and wherein the subcarrier spacing is based on the RACH configuration information.

16. The base station of claim 15, wherein the symbol offset is based on the PRACH configuration index and the subcarrier spacing.

17. The base station of claim 15, wherein the controller is further configured to:
control the transceiver to transmit a random access response (RAR) identified by a random access-radio network temporary identifier (RA-RNTI).

18. The base station of claim 17, wherein the RA-RNTI is based on the information on the slot and the symbol offset.

* * * * *